(12) United States Patent
Leep

(10) Patent No.: US 6,561,013 B1
(45) Date of Patent: May 13, 2003

(54) VEHICLE TESTING ASSEMBLY

(75) Inventor: Timothy James Leep, Zeeland, MI (US)

(73) Assignee: Burke E. Porter Machinery Company, Grand Rapids, MI (US)

(*) Notice: Subject to any disclaimer, the term of this patent is extended or adjusted under 35 U.S.C. 154(b) by 0 days.

(21) Appl. No.: 10/003,924

(22) Filed: Oct. 30, 2001

(51) Int. Cl.⁷ .............................. G01L 3/26; B26D 11/00
(52) U.S. Cl. ........................................ 73/117; 73/862.09
(58) Field of Search ...................... 73/116, 117, 862.09, 73/123–127, 670, 862.08, 862.191, 862

(56) References Cited

U.S. PATENT DOCUMENTS

| | | |
|---|---|---|
| 3,305,935 A | 2/1967 | Cady et al. |
| 3,490,276 A | 1/1970 | Maxwell et al. |
| 3,593,397 A | 7/1971 | Odier |
| 3,982,428 A | 9/1976 | Wilson |
| 4,044,609 A | 8/1977 | Asmus |
| 5,193,386 A | 3/1993 | Hesse, Jr. et al. |
| 5,311,770 A | 5/1994 | D'Angelo |
| 5,447,060 A * | 9/1995 | Smith et al. ............... 73/117 |

* cited by examiner

Primary Examiner—Eric S. McCall
Assistant Examiner—Maurice Stevens
(74) Attorney, Agent, or Firm—Howard & Howard

(57) ABSTRACT

A vehicle testing assembly for performing tests to determine certain characteristics of a motorized vehicle having a set of driven wheels. The testing assembly includes an annular roller with an outer surface. The roller is preferably formed of a steel composition. A controller is connected to the roller for retrieving data from the roller during a rotation of the roller. The testing assembly is characterized by a coating being applied to the outer surface of the roller to define a contact surface of the roller. The coating is formed of a coating composition different from the steel composition of the roller. Preferably, the coating composition comprises nickel and phosphorus. During operation of the vehicle testing assembly the wheel of the vehicle continuously contacts the contact surface of the coating to provide an accurate testing of the characteristics of the vehicle as the roller rotates.

48 Claims, 4 Drawing Sheets

VEHICLE TESTING ASSEMBLY

BACKGROUND OF THE INVENTION

1. Field of the Invention

The subject invention relates to a vehicle testing assembly having an improved construction.

2. Description of the Prior Art

Vehicle testing assemblies are widely used throughout the automotive industry for research, development, performance testing and for simulating driving conditions for vehicles. The vehicle testing assemblies can include roll test machines, which are typically used in a manufacturers plant at an end of an assembly line, and dynamometers, which are commonly used in a laboratory environment. The roll test machines are used to verify that all vehicle systems are operating correctly once the vehicle is built. The dynamometers provide precise measurement and controls which can duplicate real world conditions. Both the roll test machines and dynamometers provide a test bed for the vehicle that allows the vehicle to accelerate, run at a certain speed, and decelerate, while remaining in one place. The roll test machines can simulate real world conditions but does not duplicate them as precisely as a dynamometer.

Typically, the testing assembly of either the roll test machines or the dynamometers includes a large platform for supporting the weight of the vehicle. A single large roller and/or a pair of cradle rollers are disposed below the platform to rotate the vehicle wheels, and measure and record a desired characteristic of the vehicle. In particular, the larger roller and/or pair of cradle rollers engage the wheels of the vehicle such that the roller(s) are rotatably connected to the vehicle power train to simulate driving conditions. The roller(s) is designed with internal resistors and other features to accurately simulate real world driving conditions. In other words, the vehicle drives on the roller or pair of rollers in the same manner as on the road. Examples of vehicle testing assemblies incorporating single and cradle rollers are shown in U.S. Pat. Nos. 3,490,276 and 5,311,770.

During the use of a vehicle testing assembly for a two wheel drive vehicle, the non-driven wheels of the vehicle are held stationary on the testing assembly while the driving wheels of the vehicle rest upon the roller or rollers. The roller or rollers can be rotated by the power train of the vehicle through the wheels or can be rotated by a separate drive unit, which in turn rotates the wheels of the vehicle. During the use of a vehicle testing assembly for a four wheel drive vehicle, the vehicle is held stationary on the testing assembly while both front and rear rollers engage the driving wheels of the vehicle. The vehicle may be held stationary by securing the frame of the vehicle or by the roller configuration, i.e., using cradle rollers or retaining rollers. In either of the scenarios outlined above, numerous characteristics of the vehicle may be tested.

Often, the contact surface of the roller is simply smooth turned steel. Although cost effective, the smooth steel surface promotes tire damage under certain testing conditions. In particular, when the tire becomes excessively heated, the tires ability to resist tearing is weakened. The excessive heating occurs from the flexing or deformation of the rubber tire at the surface of the roller, rapidly compressing air at the point of contact between the tire and roller, and frictional heat created when the tire and roller slip. A tire slipping on the roller will grab and release from the roller which frequently causes tearing of the overheated tire. The slipping and damage frequently occurs during vehicle braking tests. In particular, if the driver testing the vehicle applies excessive pedal force, the tires may stop too quickly on the rollers, thereby causing the tires to slip on the roller. As the excessively heated tire tears, blocks of rubber, known as chunks, break off from the tire tread face of the tire. Rubber residue from the chunks and tire compound from the tire production process become attached to the steel roller to create "dust" buildup which causes a non-uniform contact surface on the roller. In addition, when chunking damage occurs, it is costly for vehicle manufacturers as the tire must be replaced.

In order to reduce the temperature of the tire roller interface, and thereby reduce subsequent tire damage, it is desirable to cool the surface of the roller. An example of a roller which includes some type of cooling mechanism is disclosed in U.S. Pat. No. 3,982,428. The '428 patent discloses a roller which has a pair of helical grooves formed therein. These grooves, however, do not, by themselves, provide the requisite cooling in order to prevent all tire damage.

Accordingly, it would be desirable to incorporate additional and/or alternative methods for cooling the roller or rollers of the roll test machine and dynamometer. Additionally, it would also be desirable to develop a roller which has reduced acoustical noise and does not accumulate tire rubber on the contact surface of the roller.

SUMMARY OF THE INVENTION AND ADVANTAGES

A vehicle testing assembly for performing tests to determine certain characteristics of a motorized vehicle having at least one wheel. The testing assembly comprises a roller having an annular configuration with an outer surface. The roller is formed of a roller composition. A controller is connected to the roller for retrieving data from the roller during a rotation of the roller. The testing assembly is characterized by a coating applied to the outer surface of the roller to define a contact surface of the roller. The coating is formed of a coating composition different from the roller composition. During operation of the vehicle testing assembly, the wheel of the vehicle continuously contacts the contact surface of the coating to provide an accurate testing of the characteristics of the vehicle as the roller rotates.

The subject invention therefore includes an improved roller which reduces the heating of the tire, the noise generated from the tire and roller contact, and the accumulation of tire rubber or "dust" buildup on the roller surface. The coating is of a unique composition which is discussed in greater detail below. In addition, grooves may also be incorporated into the roller to provide additional cooling and noise reduction.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1A:
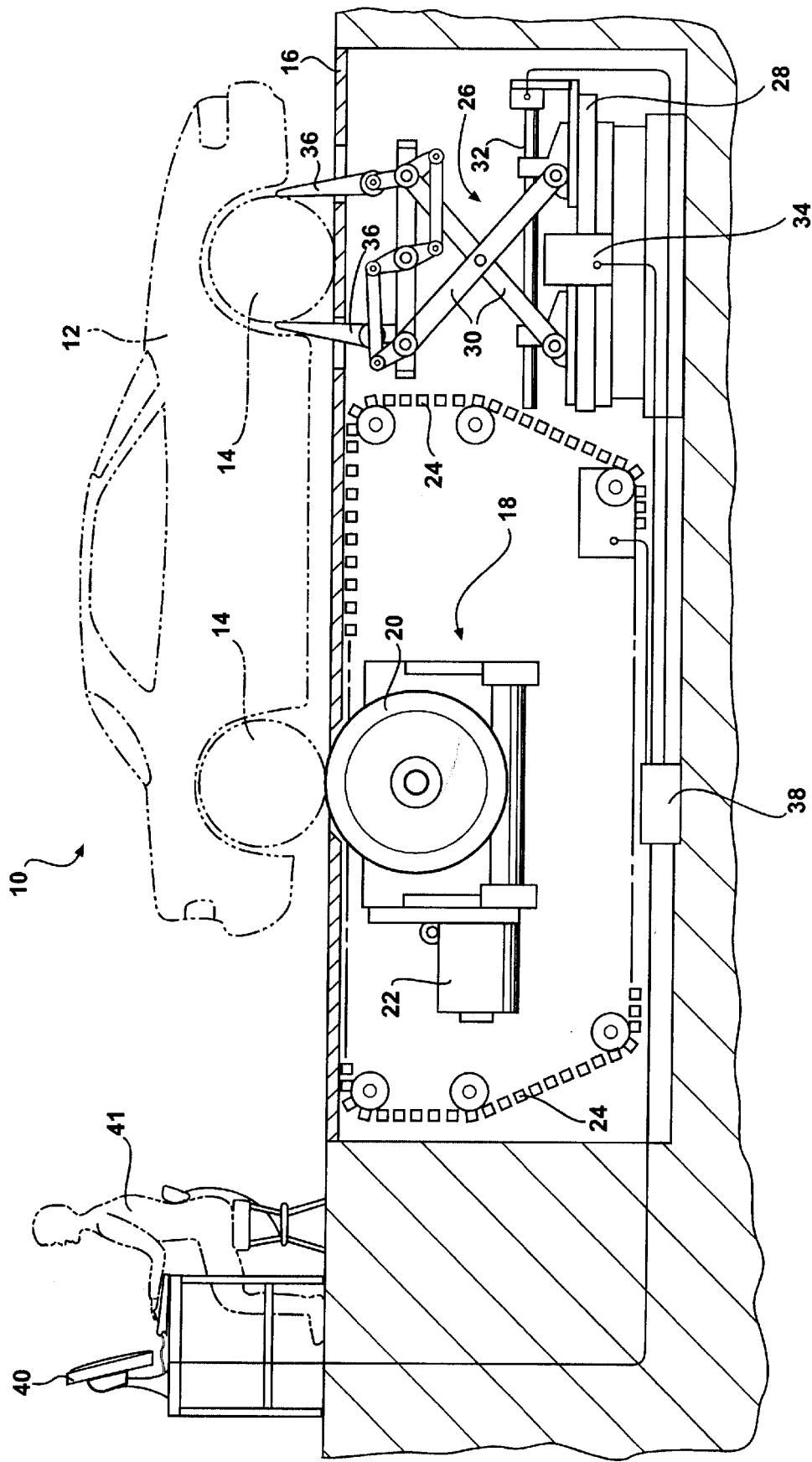
FIG. 1A is a partially cross-sectional side view of a vehicle testing assembly illustrating a dynamometer.
Figure 1B:
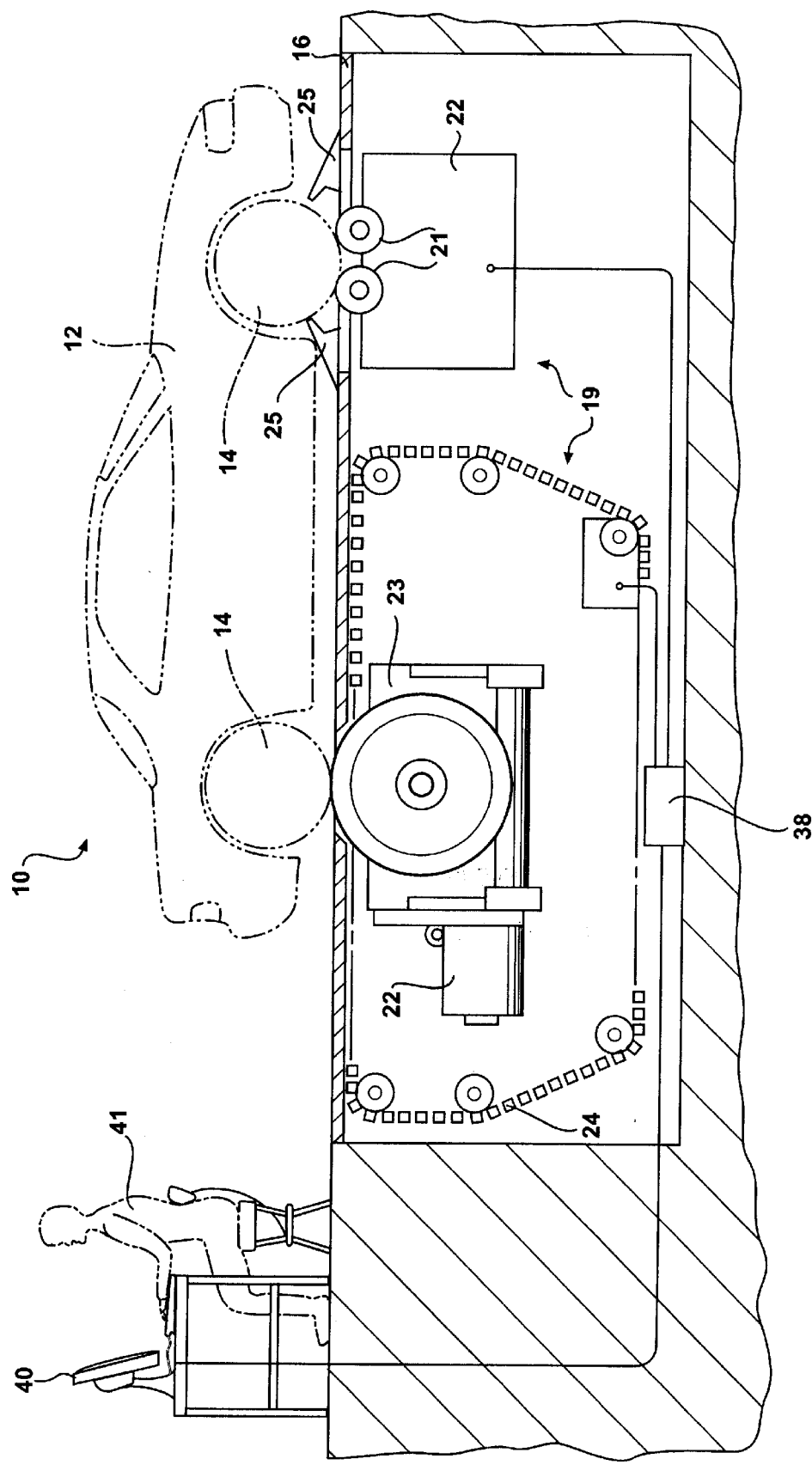
FIG. 1B is a partially cross-sectional side view of a vehicle testing assembly illustrating a roll test machine.

Referring to FIGS. 1A through 4A, wherein like numerals indicate like or corresponding parts throughout the several views, a vehicle testing assembly is generally illustrated at 10 in FIG. 1. The vehicle testing assembly 10 is designed to perform tests to determine certain characteristics of a motorized vehicle 12 wherein the motorized vehicle 12 has at least one wheel 14. The motorized vehicle 12, as illustrated in FIG. 1A, is a four-wheeled vehicle having rear-wheel drive. The motorized vehicle 12, as illustrated in FIG. 1B, is a four-wheeled vehicle having front-wheel, rear-wheel, or four-wheel drive. As appreciated, the motorized vehicle 12 may be of any suitable design having any wheel configuration, including a two wheeled vehicle such as a motorcycle and a ten wheeled vehicle such as a truck cab, as well as any suitable drive train, such as front wheel drive, rear wheel drive, or all wheel drive, as is discussed below.

The testing assembly 10 comprises a platform 16 for supporting the wheels 14 of the vehicle 12. As illustrated in FIG. 1A, the testing assembly 10 is further defined as a dynamometer 18, which is commonly used in a laboratory environment. The dynamometer 18 provides precise measurement and controls which can duplicate real world conditions. The dynamometer 18 includes a roller 20 which is disposed below the platform 16 for engaging the driving wheels 14 during the testing of the vehicle 12. The dynamometer 18 illustrated in FIG. 1A preferably includes a pair of rear rollers 20 for engaging the rear driving wheels 14 while the front non-driving wheels 14 are secured to the platform 16. As appreciated, when a front wheel drive vehicle is being tested, the front driving wheels 14 must align with the roller 20 of the dynamometer 18. It should also be appreciated that the dynamometer 18 illustrated in FIG. 1A may be of any suitable design or configuration without deviating from the scope of the subject invention.

As illustrated in FIG. 1B, the testing assembly 10 is further defined as a roll test machine 19, which is typically used in a manufacturers plant at an end of an assembly line. The roll test machine 19 provides a test bed for the vehicle 12 that allows the vehicle 12 to accelerate, run at a certain speed, and decelerate, while remaining in one place. The roll test machine 19 can simulate real world conditions but does not duplicate them precisely. In essence, the roll test machine 19 is used to verify that all of the vehicle systems are operating correctly once the vehicle 12 is built.

The roll test machine 19 includes both front 21 and rear 23 rollers which are disposed below the platform 16 for engaging the wheels 14 during the testing of the vehicle 12. The vehicle 12 illustrated in FIG. 1B can be a four-wheel drive vehicle as discussed above. Hence, the roll test machine 19 illustrated preferably includes a pair of rear rollers 23 for engaging the rear driving wheels 14 and two sets of front rollers 21 for engaging the front driving wheels 14. The front rollers 21 are illustrated as cradle rollers 21 which operate to also retain the vehicle 12 on the platform 16 as is known in the vehicle testing art. As appreciated, when a front wheel drive or a rear wheel drive vehicle 12 is being tested, the driving wheels 14 must align with one of the rollers 21, 23 and the non-driving wheels would be restrained from forward and rearward motion. It should also be appreciated that the roll test machine 19 illustrated in FIG. 1B may be of any suitable design or configuration without deviating from the scope of the subject invention.

The testing assembly 10 also includes a controller 38 connected to the roller 20, 21, 23 for retrieving data from the roller 20, 21, 23 during rotation of the roller 20, 21, 23. As discussed above in the background section, the dynamometer 18 or roll test machine 19 may be operated in a number of ways. First, a drive train of the vehicle 12 may rotate the roller 20, 21, 23 such that the controller 38 can retrieve rotational data. Alternatively, a drive mechanism 22 may be incorporated onto the roller 20, 21, 23 for rotating the roller 20, 21, 23 which subsequently rotates the wheels 14 of the vehicle 12. Preferably, the drive mechanism 22 will rotate the roller 20, 21, 23 at different predetermined speeds. As the drive mechanism 22 rotates the roller 20, 21, 23, the controller 38 can monitor the testing operation and retrieve data from the roller 20, 21, 23. The specifics of the controller 38 and its operation are discussed in greater detail below.

A wheel base alignment device 24 is mounted between the platform 16 and the dynamometer 18 or roll test machine 19 for moving the roller 20, 21, 23 relative to the platform 16 to align the roller 20, 21, 23 with the wheels 14 of the vehicle 12. A dynamometer roll test wheel base alignment device 24 may be of various types including an endless moving track 24 as shown, or a telescoping sliding frame member for moving the roller 20, 21, 23 relative to the platform 16 to align a center line of the roller 20, 21, 23 with a center line of an axle of the motorized vehicle 12.

To accurately perform the vehicle tests, the vehicle 12 is preferably held stationary relative to the platform 16. As shown in FIG. 1A, one means for holding the vehicle 12 stationary is to use a wheel lock mechanism 26 which secures the wheels 14 to the platform 16. The wheel lock mechanism 26 is preferably moveable between inoperative and operative positions wherein the inoperative position is disengaged from the vehicle 12 and the operative position is coupled to the wheels 14 of the vehicle 12. Although not illustrated, preferably there are a pair of wheel lock mechanisms 26 disposed at each side of the platform 16. Hence, both the driver side and the passenger side non-driven wheels 14 are engaged and secured to the platform 16. To ease in the understanding of the subject invention, only one of the wheel lock mechanisms 26 is discussed in greater detail hereinbelow.

The wheel lock mechanism 26 includes a frame 28 for supporting the wheel lock mechanisms 26 below the platform 16. A pair of lift arms 30 are mounted to the frame 28 and move upward and downward to facilitate the operative and inoperative positions of the wheel lock mechanism 26. The lift arms 30 preferably operate in a scissors-like fashion.

A drive shaft 32 is mounted to the frame 28 for facilitating the movement of the lift arms 30. In addition, a lateral adjuster 34 is mounted to the frame 28 to move the frame 28 relative to the other frame 28 for adjusting the relative position of the wheel lock mechanisms 26. In other words, this facilitates a sideways movement of one frame 28 relative to the other frame 28.

The wheel lock mechanism 26 also includes a pair of clamps 36 which are pivotally mounted to the lift arms 30.

The clamps 36 are adjustable to a variety of sizes and positions for coupling the wheel lock mechanism 26 to different sized wheels 14 of different sized vehicles 12.

As shown in FIG. 1B, the combination of rear roller 23 and cradle rollers 21 can also hold the vehicle 12 stationary relative to the platform 16. A pair of retractable retainers 25 can be provided. The retractable retainers 25, as illustrated, have a substantially triangular configuration. The retainers 25 retract to be flush with the platform 16 during the placement and removal of the vehicle 12 from the platform 16. The retainers 25 project upward during the testing of the retainers 12 to act as a safety device. The upward and downward movement of the retainers 25 may be accomplished in any suitable manner as is known to those skilled in the art.

As schematically illustrated, a computer system 40 is connected to the controller 38 which is in turn connected to various components of the vehicle testing assembly 10. An operator 41 can facilitate movement of the dynamometer 18, roll test machine 19, retainers 25, and/or wheel lock mechanism 26 as desired.

During an operation of the vehicle testing assembly 10, the operator 41 can set the parameters for the rotation of the roller 20, 21, 23 to perform a testing operation and can monitor the results of the test being performed. The operator 41, through the computer system 40, then retrieves data from the rotating roller 20, 21, 23. The computer system 40 can analyze the retrieved data such that the operator 41 can view of the results of the testing operation and determine certain vehicle characteristics. As is appreciated, the retrieved data can be used as pass/fail criteria, passed on to other computers, or stored for later download and analysis.

Vehicle characteristics that are typically determined relate to; performance runs, which are typically used for checking new vehicles coming off an assembly line; checking and adjusting vehicles following an overhaul; or for performing on-the-spot inspections. In addition, durability runs can be performed which are intended to simulate thousands of miles of road service. The durability runs can be used for laboratory development of new automobiles, engines, drivetrains and the like. Of course, during any of these types of testing operations, the speed of the engine, torque of the engine, and braking power of the vehicle 12 can be tested.

Figure 2:
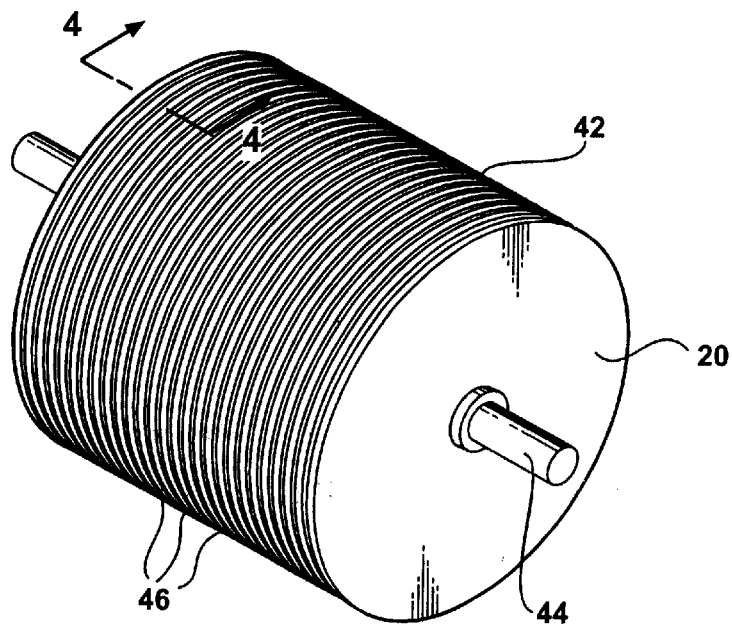
FIG. 2 is a perspective view of a dynamometer roller.
Figure 3:
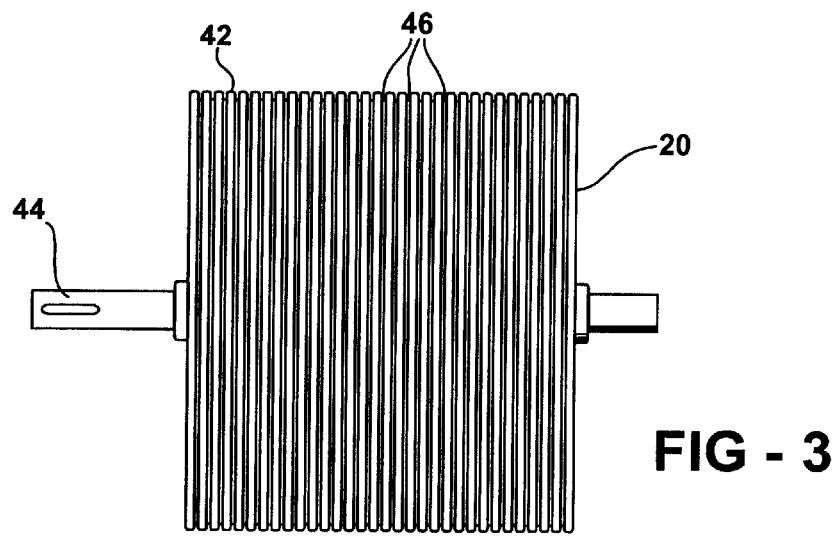
FIG. 3 is a front view of the dynamometer roller.

Referring to FIGS. 2 and 3, the roller 20 of the dynamometer 18 is shown in greater detail. It should be appreciated that the specifics of the roller as now discussed relate to one or more of the roller 20 of the dynamometer 18 as shown in FIG. 1A and the rear 23 and cradle 21 rollers of the roll test machine 19 as shown in FIG. 1B. In addition, the roller as herein described may be used on any type or configuration of vehicle testing assemblies.

The roller 20 has an annular configuration with an outer surface 42. The roller 20 is formed of a roller composition which is preferably steel, i.e., essentially an alloy of iron and 0.02 to 1.5% carbon. It should be appreciated that the roller composition may be of any suitable material. A turnshaft 44 is disposed within the center of the annular roller 20.

At least one groove 46 is formed within the outer surface 42 of the roller 20 for allowing air to pass between the wheel 14 of the vehicle 12 and the roller 20 during rotation of the roller 20. Preferably there are a plurality of grooves 46 formed within the outer surface 42 and circumferentially spaced about the annular roller 20. Even more preferably, the grooves 46 are formed continuous about the outer surface 42 of the annular roller 20.

The forming of the grooves 46 provide a significant reduction in tire damage, noise, and accumulation of rubber on the outside of the roller 20. The roller 20 appears to be essentially self-cleaning. It is contemplated that the grooves 46 allow air that is normally compressed into the tread of the tire to escape at a lower pressure as the tire travels over the roller 20. As the air compression is less, heat build-up is less, thus minimizing the weakening effect that excessive heat has on tire treads.

Figure 4:
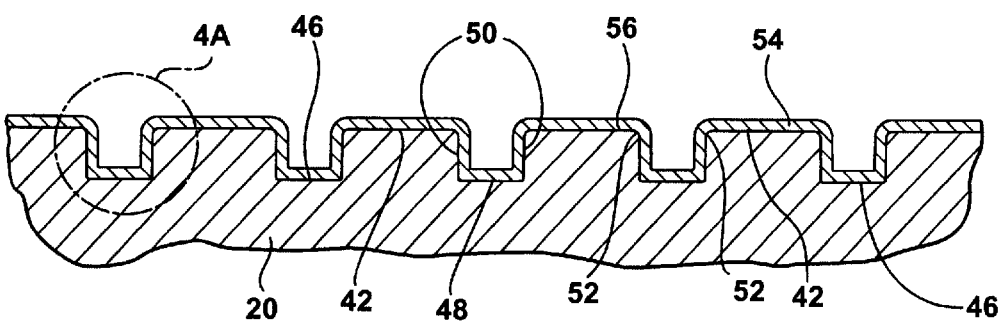
FIG. 4 is a cross-sectional view taken along line 4—4 of FIG. 2 illustrating a groove having a substantially rectangular configuration.
Figure 4A:
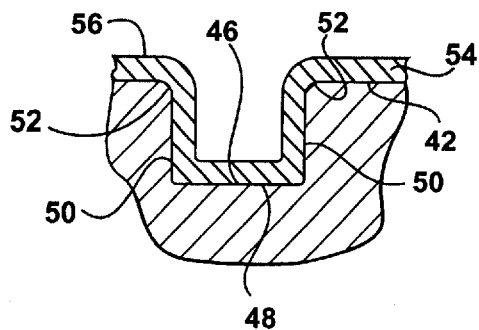
FIG. 4A is an enlarged cross-sectional view of FIG. 4.

Referring now to FIGS. 4 and 4A, the grooves 46 of the roller 20 are shown in greater detail. In the embodiment shown in FIGS. 4 and 4A, the grooves 46 include a base 48 and opposing walls 50 interconnecting the base 48 with the outer surface 42 of the roller 20. One contemplated embodiment includes the walls 50 of the grooves 46 being at least one-eighth (⅛) inch deep, with the bases 48 of the groove 46 being at least one-eighth (⅛) inch wide, and the grooves 46 being spaced at least one-quarter (¼) inches apart. It should be appreciated by those known in the art that the grooves 46 may be of any particular size, depth, width, or configuration and may be spaced at any suitable distance apart. In particular, it is contemplated that the grooves 46 may be spaced substantially apart or may be placed closer together. Representative examples of alternative embodiments for the configurations of the grooves 46 are illustrated in subsequent Figures discussed hereinbelow. Remaining with the embodiment of FIGS. 4 and 4A, the grooves 46 include a curved portion 52 at the interconnection between the walls 50 and the outer surface 42. The curved portion 52 of the groove 46 further improves the operation of the roller 20 wherein any sharp corners on the roller 20 are eliminated. In addition, this embodiment illustrates the grooves 46 having a substantially rectangular configuration with straight walls 50 and a flat base 48.

The testing assembly 10 is characterized by a coating 54 being applied to the outer surface 42 of the roller 20 to define a contact surface 56 of the roller 20. The coating 54 is formed of a coating composition that is different from the roller composition. During operation of the testing assembly 10, the wheel 14 of the vehicle 12 continuously contacts the contact surface 56 of the coating 54 to provide an accurate testing of the characteristics of the vehicle 12 as the roller 20 rotates at the predetermined speeds. The coating composition may be of any suitable element or combination of elements. Particular contemplated compositions will be discussed in greater detail below. It should be appreciated that the coating composition as discussed in subsequent detail in no way limits the subject invention to any particular type of coating composition, so long as the coating composition is different from the roller composition.

Preferably, the coating composition comprises nickel. Even more preferably, the coating composition comprises from 87 to 98 parts by weight of the nickel based on 100 parts by weight of the coating composition. Another embodiment contemplates that the coating composition comprises nickel and phosphorous. In particular, the coating composition comprises from 2 to 13 parts by weight of the phosphorous based on 100 parts by weight of the coating composition.

As illustrated, the coating 54 is also applied to the grooves 46 and the outer surface 42 such that the air passes between the wheel 14 of the vehicle 12 and the coating 54 during rotation of the roller 20. The preferred thickness of the coating 54 ranges from 0.0015 to 0.0020 inches. It should be appreciated that the thickness of the coating 54, as well as the application of the coating 54 into the grooves 46, can be modified without deviating from the overall scope of the subject invention. One contemplated alternative is to apply the coating to the roller 20 and then form the grooves 46 within the roller 20 such that the coating 54 is not applied within the grooves 46.

The coating 54 is preferably applied to the outer surface 42 of the roller 20 by an electrolysis process. As known to those skilled in the art, an electrolysis process charges both the roller 20 and the coating composition such that the coating 54 is attracted to the outer surface 42 of the roller 20. It should be appreciated that any known process of applying a coating to a material can be implemented without deviating from the scope of the subject invention.

It is important that the coating 54 have certain characteristics in order to optimize the operation of the roller 20 as discussed above. In particular, the coating 54 is designed to dissipate the heat that is generated between the wheel 14 of the vehicle 12 and the roller 20. The coating 54 is also designed to provide a certain surface roughness to the contact surface 56, a certain hardness for the coating 54, and a certain wear resistance of the coating 54. The specifics of these characteristics are now discussed in greater detail.

The contact surface 56 preferably has a surface roughness ranging from 10 to 200 micro-inches, and more preferably 32 to 100 micro-inches. The surface roughness is calculated by the average height variations on the contact surface 56. This calculation provides an average surface roughness which is typically measured in the micro-inches.

The coating 54 preferably has a hardness ranging from 45 to 68 HRc, and more preferably from 56 to 60 HRc. As understood by those skilled in the art, HRc is a Rockwell hardness scale unit which associates a value when an indentation test is performed on the coating 54. This scale unit is typically used to evaluate metallic materials. The Rockwell hardness test is a general method for measuring the bulk hardness of metallic and polymer materials. The hardness testing typically correlates with strength, wear resistance, and other properties. Hardness testing is widely used for material evaluation due to its simplicity and low cost relative to direct measurement of many properties. An indenter (not shown) is impressed into the test sample, i.e., the coating 54, at a prescribed load to measure the coating's 54 resistance to deformation. A Rockwell hardness number, the scale unit, is calculated from the depth of permanent deformation of the coating 54 after application and removal of the load.

There are other hardness tests also utilized in the industry. One such test is known as the Vickers hardness test which uses the scale designation, or unit, of VHN. Using the Vickers hardness test, the hardness of the coating 54 preferably ranges from 446 to 940 VHN, and more preferably from 613 to 697 VHN. The Vickers hardness test uses a 136° diamond pyramid micro-indentation apparatus. The micro-indenter apparatus produces a square indentation, the diagonals of which are measured. The hardness is calculated by dividing the applied load by the surface area of the indentation. Both the Rockwell and the Vickers hardness tests provide a value for the hardness of the coating 54. It should be appreciated that any suitable hardness value may be associated with the coating 54 so long as it correlates to the hardness values outlined above.

The coating 54, as initially applied to the outer surface of the roller 20, has a hardness ranging from 45 to 50 HRc. The coating 54 can be heat treated after the coating 54 is applied to the outer surface 42 of the roller 20. If the coating 54 is heat treated, the hardness ranges from 51 to 68 HRc. The heat treatment of the coating 54 on the roller 20 may be done by any suitable method as is known in the art. It is well known that heat treatment of metal coatings will affect the physical and chemical characteristics of the coating thereby affecting the ultimate hardness and corrosion resistance. At a maximum point of hardness, i.e., the coating has been excessively heat treated, the coating exhibits a reduced corrosion resistance due to the formation of many cracks in the coating 54. Hence, it is desirable that the coating 54 be heat treated to increase the hardness, yet not be heat treated to an extent where the corrosion resistance of the coating suffers. As mentioned above, the most preferred hardness for the coating 54 ranges from 56 to 60 HRc after being heat treated.

Preferably, the coating 54 has a density ranging from 7.5 to 8.2 grams per cubic centimeter (g/cm$^3$) once applied to the outer surface 42 of the roller 20. It should be appreciated that the density of the coating 54 may vary significantly depending upon the particular coating composition.

It is also preferred that the coating 54 has a wear resistance ranging from 16 to 20 milligrams per 1,000 cycles when initially applied to the roller 20, i.e., before being heat treated. The wear resistance is measured by calculating the amount of weight loss (in milligrams) of the coating 54 relative to a number of cycles performed. This wear resistance may also be associated with an index called the Taber Wear Index ("TWI") which is calculated by the following formula:

$$TWI = \frac{\text{specimen weight loss (milligrams)} \times 1{,}000}{\text{number of cycles}}$$

The lower the wear index, the better the abrasion resistance of the material. After the coating 54 is heat treated, the coating 54 preferably has a wear resistance of 12 milligrams per 1,000 cycles.

It is contemplated that the process of forming the roller 20 with the coating 54 has become fully apparent from the foregoing description. However, for completeness of disclosure, the process of manufacturing the roller 20 will be briefly discussed.

Initially, the roller 20 is formed with the roller composition wherein the roller 20 has an annular configuration with an outer surface 42. As discussed above, the roller composition is preferably steel such that the step of forming the roller 20 is further defined as forming a steel roller 20.

The process of manufacturing the roller 20 preferably includes the step of forming grooves 46 within the outer surface 42 of the roller 20. The edges of the grooves 46 are then machined to define a curved portion 52 at the outer surface 42 of the roller 20. The roller 20 is then pre-cleaned by any suitable method.

A coating 54 is then applied to the outer surface 42 of the roller 20 wherein the coating 54 is formed of the coating composition which is different from the roller composition used in forming the roller. In the preferred embodiment, the coating 54 is also applied to the grooves 46. Alternatively, the grooves 46 may be formed in the roller 20 after the coating 54 is applied. The step of applying the coating 54 is further defined as applying a coating composition comprising nickel. The step of applying the coating 54 is even further defined as applying a coating composition comprising phosphorous.

The process of manufacturing the roller 20 also includes the step of pre-cleaning the roller 20 before applying the coating 54 to the roller 20. As discussed above, the step of applying the coating 54 is further defined as electrically charging both the roller 20 and the coating 54 such that the coating 54 is applied through the use of an electrolysis process. After the coating 54 is applied, the process of manufacturing the roller 20 includes the step of heat treating the roller 20 with the coating 54.

Figure 5:
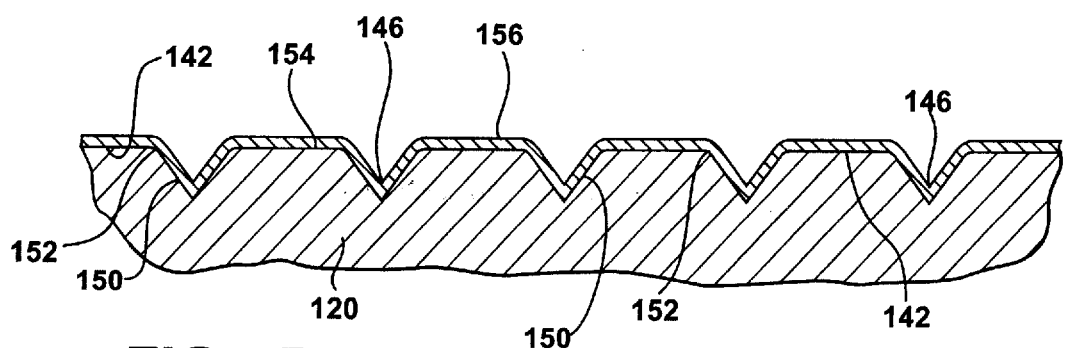
FIG. 5 is a cross-sectional view illustrating an alternative embodiment of the groove, wherein the groove has a V-shaped configuration.
Figure 6:
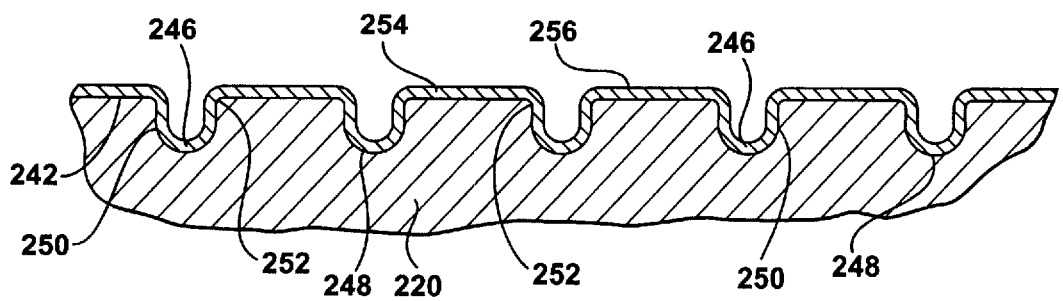
FIG. 6 is a cross-sectional view illustrating another alternative embodiment of the groove, wherein the groove has a U-shaped configuration.
Figure 7:
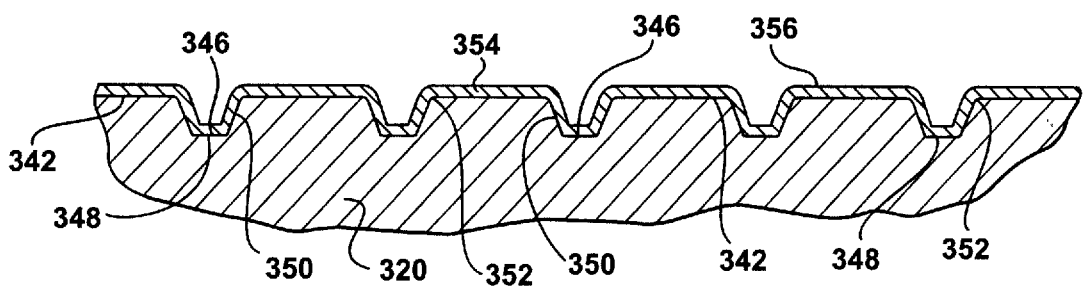
FIG. 7 is a cross-sectional view illustrating yet another alternative embodiment of the groove, wherein the groove has angled walls and a flat bottom.

Referring to FIGS. 5, 6 and 7, alternative embodiments of the grooves are illustrated and discussed in greater detail. In particular, referring to FIG. 5, wherein like numerals increased by 100 indicate like or corresponding parts, a roller 120 is illustrated. A plurality of V-shaped grooves 146 are disposed within the outer surface 142 of the roller 120. The coating 154 is applied to the outer surface 142 of the roller 120 and the v-shaped grooves 146 to define a contact surface 156. The walls 150 are angled from the outer surface 142 until they contact each other, thereby forming the V-shaped configuration. Curved portions 152 are formed at the intersection of the walls 150 and the outer surface 142.

Turning now to FIG. 6, wherein like numerals increased by 200 indicate like or corresponding parts, the roller 220 includes a plurality of U-shaped grooves 246 formed within the outer surface 242 of the roller 220. The coating 254 is applied to the outer surface 242 of the roller 220 and within the U-shaped grooves 246 to define a contact surface 256. The U-shaped grooves 246 define a curved base 248 and substantially straight walls 250. A curved portion 252 is formed at the intersection between the walls 250 and the outer surface 242 of the roller 220.

Turning now to FIG. 7, wherein like numerals increased by 300 indicate like or corresponding parts, the roller 320 includes a plurality of grooves 346 formed within the outer surface 342 of the roller 320. The coating 354 is applied to the grooves 346 and the outer surface 342 of the roller 320 to define a contact surface 350. The grooves 346 include a flat base 348 and angled walls 350. A curved portion 352 is formed at the intersection between the angled walls 350 and the outer surface 342 of the roller 320.

Obviously, many modifications and variations of the present invention are possible in light of the above teachings. Hence, the invention may be practiced otherwise than as specifically described within the scope of the appended claims.

What is claimed is:

1. A vehicle testing assembly for performing tests to determine certain characteristics of a motorized vehicle having at least one wheel, said testing assembly comprising:
    a roller having an annular configuration with an outer surface, said roller being formed of steel; and
    a controller connected to said roller for retrieving data from said roller during a rotation of said roller;
    said testing assembly characterized by a coating applied to said outer surface of said roller to define a contact surface of said roller, said coating being formed of a coating composition different from said steel of said roller wherein said coating dissipates heat generated between the wheel of the vehicle and said roller as the wheel of the vehicle continuously contacts said contact surface of said coating to reduce damage to the wheel and to provide an accurate testing of the characteristics of the vehicle as said roller rotates.

2. A testing assembly as set forth in claim 1 wherein said coating composition comprises nickel.

3. A testing assembly as set forth in claim 2 wherein said coating composition comprises from 87 to 98 parts by weight of said nickel based on 100 parts by weight of said coating composition.

4. A testing assembly as set forth in claim 2 wherein said coating composition comprises phosphorus.

5. A testing assembly as set forth in claim 4 wherein said coating composition comprising from 2 to 13 parts by weight of said phosphorus based on 100 parts by weight of said coating composition.

6. A testing assembly as set forth in claim 4 wherein said coating composition comprises from 87 to 98 parts by weight of said nickel and from 2 to 13 parts by weight of said phosphorus based on 100 parts by weight of said coating composition.

7. A testing assembly as set forth in claim 1 wherein said coating has a thickness ranging from 0.0015 to 0.002 inches.

8. A testing assembly as set forth in claim 1 wherein said contact surface has a surface roughness ranging from 32 to 100 microinches.

9. A testing assembly as set forth in claim 1 wherein said coating has a hardness ranging from 45 to 68 HRc.

10. A testing assembly as set forth in claim 1 wherein said coating has a hardness ranging from 45 to 50 HRc when initially applied to said outer surface of said roller.

11. A testing assembly as set forth in claim 10 wherein said roller with said coating is heat treated after said coating is applied to said outer surface of said roller.

12. A testing assembly as set forth in claim 11 wherein said coating has a hardness ranging from 51 to 68 HRc once heat treated.

13. A testing assembly as set forth in claim 1 wherein said coating has a density ranging from 7.5 to 8.2 g/cm$^3$ once applied to said outer surface of said roller.

14. A testing assembly as set forth in claim 1 wherein said coating has a wear resistance ranging from 16 to 20 mg/1,000 cycles when initially applied as calculated by determining the amount of weight loss of said coating relative to a number of cycles performed.

15. A testing assembly as set forth in claim 14 wherein said roller with said coating is heat treated after said coating is applied to said outer surface of said roller.

16. A testing assembly as set forth in claim 15 wherein said coating has a wear resistance of 12 mg/1,000 cycles once heat treated.

17. A testing assembly as set forth in claim 1 wherein said coating is applied to said outer surface of said roller by an electrolysis process.

18. A testing assembly as set forth in claim 1 further including at least one groove formed within said outer surface of said roller for allowing air to pass between the wheel of the vehicle and said roller during said rotation of said roller.

19. A testing assembly as set forth in claim 18 wherein said groove includes a base and opposing walls interconnecting said base with said outer surface of said roller.

20. A testing assembly as set forth in claim 19 wherein said groove includes a curved portion at said interconnection between with said walls and said outer surface.

21. A testing assembly as set forth in claim 18 wherein said coating is applied to said groove and said outer surface such that the air passes between the wheel of the vehicle and said coating during rotation of said roller.

22. A testing assembly as set forth in claim 21 wherein said coating composition comprises nickel.

23. A testing assembly as set forth in claim 22 wherein said coating composition comprises phosphorus.

24. A testing assembly as set forth in claim 1 further including a plurality of grooves formed within said outer surface and circumferentially spaced about said annular roller for allowing air to pass between the wheel of the vehicle and said roller during said rotation of said roller.

25. A testing assembly as set forth in claim 24 wherein said grooves are continuous about said outer surface of said annular roller.

26. A testing assembly as set forth in claim 24 wherein each of said grooves include a base and opposing walls interconnecting said base with said outer surface of said roller.

27. A testing assembly as set forth in claim 26 wherein each of said walls of said grooves are at least ⅛ inch deep, each of said bases of said grooves are at least ⅛ inch wide, and said grooves are spaced at least ¼ inches apart.

28. A testing assembly as set forth in claim 26 wherein each of said grooves includes a curved portion at said interconnection between with said walls and said outer surface.

29. A testing assembly as set forth in claim 26 wherein said grooves have a substantially rectangular configuration with straight walls and a flat base.

30. A testing assembly as set forth in claim 26 wherein said walls are angled toward a flat base.

31. A testing assembly as set forth in claim 24 wherein said grooves have a substantially V-shaped configuration.

32. A testing assembly as set forth in claim 24 wherein said grooves have a substantially U-shaped configuration.

33. A testing assembly as set forth in claim 24 wherein said coating is applied to each of said grooves and said outer surface such that the air passes between the wheel of the vehicle and said coating during rotation of said roller.

34. A testing assembly as set forth in claim 33 wherein said coating composition comprises nickel.

35. A testing assembly as set forth in claim 34 wherein said coating composition comprises phosphorus.

36. A testing assembly as set forth in claim 1 further including a drive mechanism mounted to said roller for rotating said roller at predetermined speeds.

37. A process of manufacturing a roller for a vehicle testing assembly comprising the steps of:

forming the roller of steel wherein the roller has an annular configuration with an outer surface; and applying a coating onto the outer surface of the roller wherein the coating is formed of a coating composition that is different from the steel used in forming the roller wherein the coating dissipates heat generated between a wheel of a vehicle and the roller as the wheel continuously contacts the coating.

38. A process as set forth in claim 37 wherein the step of applying the coating is further defined as applying a coating composition comprising nickel.

39. A process as set forth in claim 38 wherein the step of applying the coating is further defined as applying a coating composition comprising phosphorus.

40. A process as set forth in claim 37 further including the step of pre-cleaning the roller before applying the coating to the roller.

41. A process as set forth in claim 37 wherein the step of applying the coating is further defined as electrically charging both the roller and the coating such that the coating is applied through the use of an electrolysis process.

42. A process as set forth in claim 37 further including the step of heat treating the roller with the coating after the coating is applied to the roller.

43. A process as set forth in claim 37 further including the step of forming grooves within the outer surface of the roller for allowing air to pass between a wheel of a vehicle and the roller during a rotation of the roller.

44. A process as set forth in claim 43 further including the step of applying the coating to the grooves.

45. A process as set forth in claim 44 further including the step of machining the edges of the grooves to define a curved portion at the outer surface of the roller.

46. A process as set forth in claim 37 further including the step of rotating the roller to perform a testing operation.

47. A process as set forth in claim 46 further including the step of retrieving data from the rotating roller.

48. A process as set forth in claim 47 further including the step of analyzing the retrieved data.

\* \* \* \* \*